(12) United States Patent
Zhang et al.

(10) Patent No.: US 6,447,935 B1
(45) Date of Patent: *Sep. 10, 2002

(54) METHOD AND SYSTEM FOR REDUCING ASSYMETRY IN A SPIN VALVE HAVING A SYNTHETIC PINNED LAYER

(75) Inventors: Jing Zhang, San Jose; Ningjia Zhu, Cupertino; Yiming Huai, Pleasanton; Amritpal Singh Rana, Union City; Wenjie Chen, Cupertino, all of CA (US)

(73) Assignee: Read-Rite Corporation, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/447,944

(22) Filed: Nov. 23, 1999

(51) Int. Cl.$^7$ ................................................. G11B 5/66
(52) U.S. Cl. ............ 428/692; 428/694 R; 428/694 TS; 428/694 TM; 428/900; 427/128; 427/129; 427/130; 360/113; 360/125; 360/126; 338/32 R; 324/252
(58) Field of Search .............................. 428/692, 694 R, 428/694 TS, 694 TM, 900; 427/128–130; 360/113, 125, 126; 338/32 R; 324/252

(56) References Cited

U.S. PATENT DOCUMENTS

| | | | |
|---|---|---|---|
| 3,947,889 A | 3/1976 | Lazzari | 360/315 |
| 5,021,909 A | 6/1991 | Shiiba | 360/327.1 |
| 5,155,642 A | 10/1992 | Voegeli | 360/327.22 |
| 5,206,590 A | 4/1993 | Dieny et al. | 324/252 |
| 5,287,238 A | 2/1994 | Baumgart et al. | 360/314 |
| 5,325,253 A | 6/1994 | Chen et al. | 360/327.1 |
| 5,381,291 A | 1/1995 | Madsen et al. | 360/327.1 |
| 5,638,235 A * | 6/1997 | Gill | 360/327.31 |
| 5,650,887 A | 7/1997 | Dovek et al. | 360/75 |
| 5,666,246 A * | 9/1997 | Gill | 360/327.23 |
| 5,666,248 A | 9/1997 | Gill | 360/324.1 |
| 5,677,625 A | 10/1997 | Dieny | 324/252 |
| 5,706,151 A | 1/1998 | Smith | 360/315 |
| 5,739,988 A | 4/1998 | Gill | 360/324.12 |
| 5,828,530 A | 10/1998 | Gill et al. | 360/319 |
| 5,828,531 A | 10/1998 | Gill | 360/324.12 |
| 5,852,531 A * | 12/1998 | Yamada | 360/324.1 |

* cited by examiner

Primary Examiner—Leszek Kiliman
(74) Attorney, Agent, or Firm—Sawyer Law Group LLP

(57) ABSTRACT

A method and system for providing a spin valve for use in a magnetoresistive head is disclosed. The method and system include providing a synthetic pinned layer, a nonmagnetic spacer layer, and a free layer. The free layer has a first magnetization canted from a first direction by a first angle. The nonmagnetic spacer layer is disposed between the free layer and the synthetic pinned layer. The synthetic pinned layer has a second magnetization in a second direction. The second direction is canted from a third direction that is transverse to the first direction by a second angle. The second magnetization is substantially orthogonal to the first magnetization.

25 Claims, 7 Drawing Sheets

METHOD AND SYSTEM FOR REDUCING ASSYMETRY IN A SPIN VALVE HAVING A SYNTHETIC PINNED LAYER

FIELD OF THE INVENTION

The present invention relates to magnetoresistive heads, and more particularly to a method and system for providing a spin valve having a synthetic pinned layer which has reduced amplitude asymmetry and, in one embodiment, improved amplitude of the magnetoresistance.

BACKGROUND OF THE INVENTION

Currently, spin valves are typically used for the magnetoresistive (MR) element in MR read heads. A spin valve includes a free layer and a pinned layer which are both magnetic. The free layer and pinned layer are separated by a nonmagnetic spacer layer. A spin valve also includes a conventional pinning layer, such as an antiferromagnetic (AFM) layer, that is used to pin the magnetization of the pinned layer in the desired direction. The pinned layer of a conventional spin valve is typically composed of a single magnetic material. The magnetic moment of the pinned layer is typically fixed by exchange coupling to the AFM layer. The spin valve may also include a capping layer. When used in a MR head, antiferromagnets or hard magnets are also typically used to ensure that the free layer has a single domain structure.

The magnetizations of the pinned layer and free layer are controlled in the conventional spin valve. The magnetizations of the pinned layer and free layer are typically biased to be orthogonal when no external field is applied. In other words, the pinning layer typically pins the magnetization of the pinned layer in a direction that is substantially ninety degrees from the direction of magnetization of the free layer when no recording media is being read. In a conventional MR head, the direction of magnetization of the pinned layer is approximately transverse, ninety degrees from the direction that current travels through the conventional spin valve.

The free layer is also typically biased to set the direction of magnetization of the free layer when no external field is applied. The free layer is typically biased using a combination of three fields. The combination of fields typically ensures that the free layer is biased longitudinally when no external field, for example from a recording media, is applied. Thus, the free layer is biased so that the magnetization is approximately in the direction that current flows through the conventional spin valve when no external field is applied. The fields which bias the free layer include a magnetic field generated by a bias current driven through the spin valve during use, an interlayer coupling between the pinned layer and the free layer, and the demagnetization field of the pinned layer. The combination of these three fields bias the free layer in the longitudinal direction In order to improve the stability of the magnetization of the pinned layer, a synthetic pinned layer is used in synthetic spin valves. Such synthetic spin valves are substantially the same as conventional spin valves, except for the use of a synthetic pinned layer in lieu of a conventional pinned layer. Thus, the magnetization of the synthetic pinned layer is pinned in the transverse direction, ninety degrees from the longitudinal direction in which the magnetization of the free layer lies. Such synthetic pinned valves will be referred to as "synthetic spin valves having a transverse pinned layer" and the synthetic pinned layers will be referred to as "transverse synthetic pinned layers." The transverse synthetic pinned layer includes two magnetic layers that are separated by a nonmagnetic spacer layer. The two magnetic layers within the transverse synthetic pinned layer are antiferromagnetically coupled. Consequently, the net magnetic moment of the transverse synthetic pinned layer is significantly less than the magnetic moment for the conventional pinned layer.

Although the transverse synthetic pinned layer is more magnetically stable, the synthetic spin valve having a transverse pinned layer exhibits an undesirable asymmetry. The reduction in the magnetic moment of the transverse-synthetic pinned layer results in a demagnetization field from the transverse synthetic pinned layer that is less than the demagnetization field of the conventional pinned layer of the a conventional spin valve. Consequently, the combination of fields no longer biases the free layer in the longitudinal direction. The combination of the fields from the bias current and the interlayer coupling for the synthetic spin valve having a transverse pinned layer may be approximately the same as the demagnetization field of the conventional spin valve having the conventional pinned layer. However, because the demagnetization field of the transverse pinned layer is reduced, the three fields no longer bias the free layer of the synthetic spin valve having a transverse pinned layer longitudinally. Instead, the free layer may be less than ninety degrees from the transverse direction.

Because the magnetization of the free layer is tilted from the longitudinal direction in the absence of an external field, the response of the synthetic spin valve having a transverse pinned layer is asymmetric. Stored data in a recording media generate a magnetic field in a first direction or a magnetic field in a second direction. The second direction is opposite to the first direction. When the conventional spin valve reads the recording media, the free layer experiences fields due to the recording media. Because it is tilted from the longitudinal direction, the magnetization of the free layer will rotate more due to the field in one direction than the field in the other direction. The MR of the synthetic spin valve having a transverse pinned layer depends upon the difference in the directions of magnetization for the free layer and the transverse synthetic pinned layer. Because the free layer rotates more in one direction than the other, the MR of the synthetic spin valve having a transverse pinned layer is larger for fields from the recording media in one direction than the other. Consequently, the response of the synthetic spin valve having a transverse pinned layer is asymmetric. Asymmetry in the response is undesirable. If the asymmetry is large enough, the synthetic spin valve having a transverse pinned layer may be unusable.

Accordingly, what is needed is a system and method for reducing the asymmetry in a spin valve having a synthetic pinned layer. The present invention addresses such a need.

SUMMARY OF THE INVENTION

The present invention provides a method and system for providing a spin valve for use in a magnetoresistive head. The method and system comprise providing a synthetic pinned layer, a nonmagnetic spacer layer, and a free layer. The free layer has a first magnetization canted from a first direction by a first angle. The nonmagnetic spacer layer is disposed between the free layer and the synthetic pinned layer. The synthetic pinned layer has a second magnetization in a second direction. The second direction is canted from a third direction that is transverse to the first direction by a second angle. The second magnetization is substantially orthogonal to the first magnetization.

According to the system and method disclosed herein, the present invention provides a spin valve utilizing a synthetic free layer and which has reduced asymmetry. Furthermore, the amplitude of the magnetoresistive signal is improved.

DETAILED DESCRIPTION OF THE INVENTION

The present invention relates to an improvement in spin valves which include synthetic pinned layers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and. features described herein.

Figure 1:
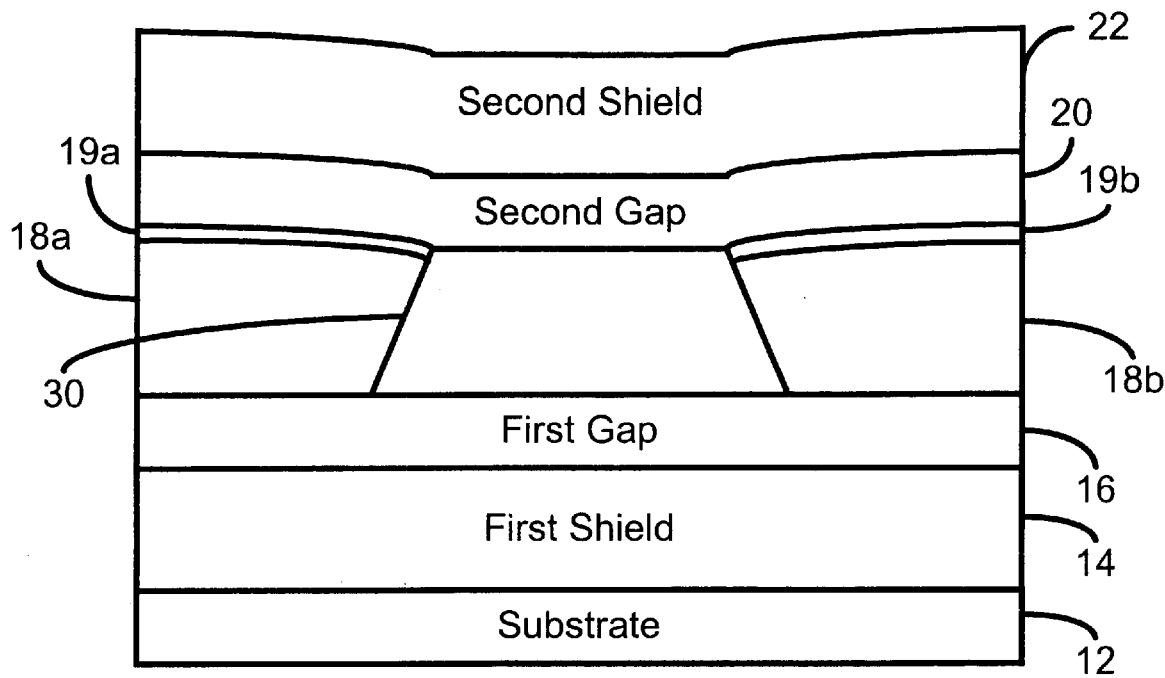
FIG. 1 is a diagram of a magnetoresistive head.

FIG. 1 is a block diagram of a magnetoresistance ("MR") head 10. The MR head 10 includes a first shield 14 formed on a substrate 12. The MR head 10 also includes a first gap 16 separating a MR sensor 30 from the first shield 14. The MR head 10 also includes a pair of hard bias layers 18a and 18b. The hard bias layers 18a and 18b magnetically bias layers in the MR element 30. The MR head 10 also includes lead layers 19a and 19b, which conduct current to and from the MR element 30. A second gap 20 separates the MR sensor 30 from a second shield 22. When brought in proximity to a recording media (not shown), the MR head 10 reads data based on a change in the resistance of the MR sensor 30 due to the field of the recording media.

Figure 2A:
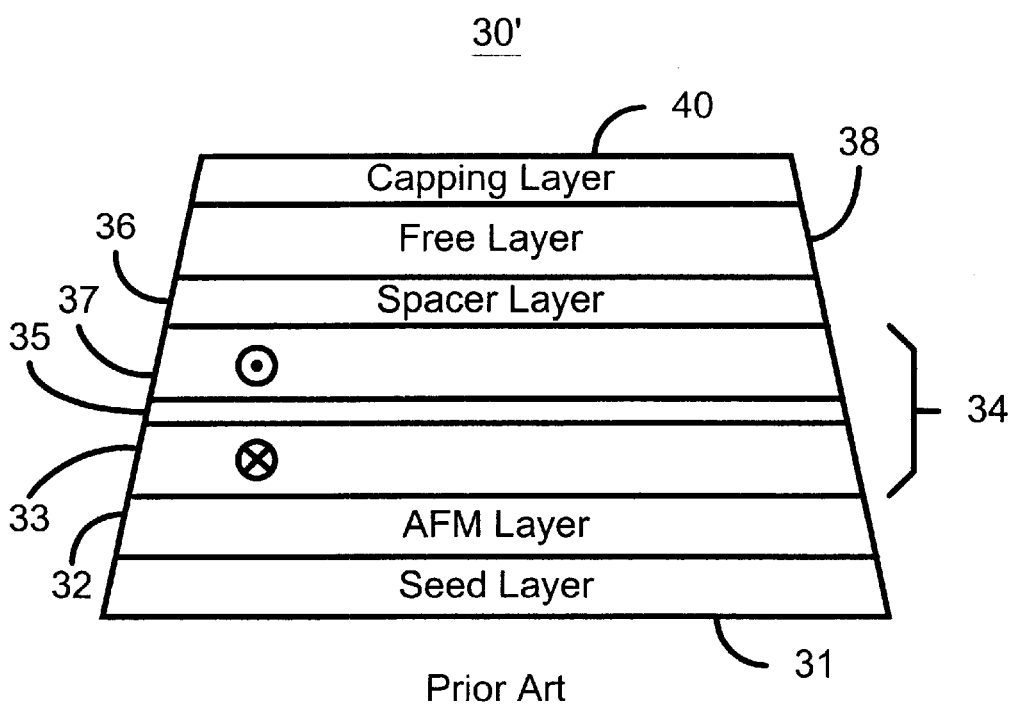
FIG. 2A is a diagram of a synthetic spin valve having a transverse pinned layer.
Figure 2B:
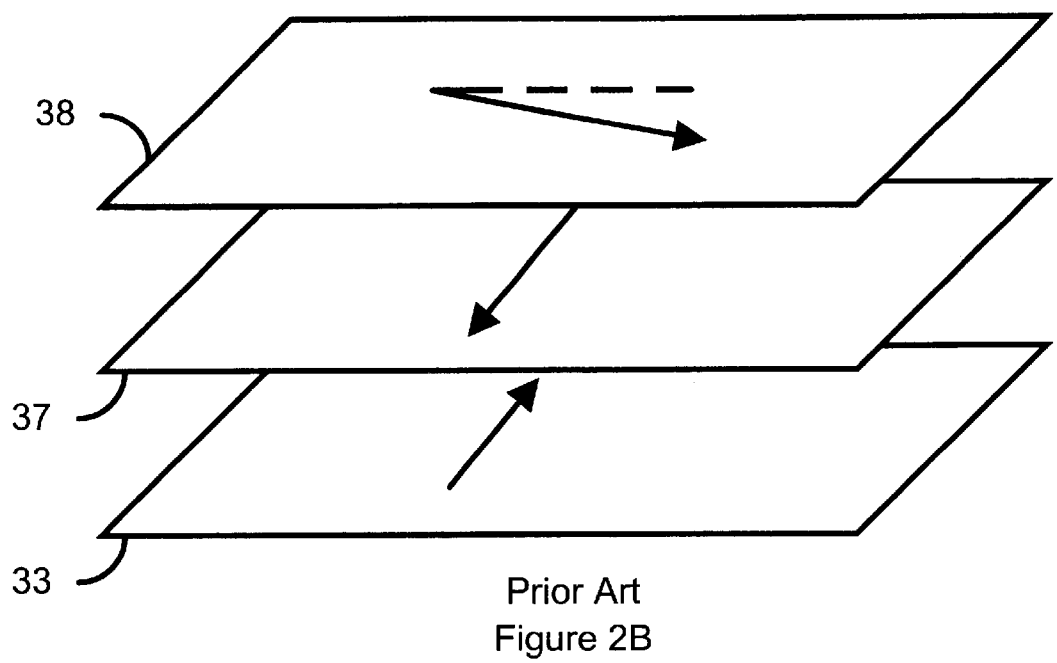
FIG. 2B is another view of the synthetic spin valve having a transverse pinned layer.

In conventional systems, the MR sensor 30 is a spin valve, which senses magnetically stored data using giant magnetoresistance ("GMR"). FIG. 2A depicts a synthetic spin valve 30' which uses a synthetic pinned layer that is pinned in the transverse direction. The synthetic spin valve 30' will be referred to as "a synthetic spin valve having a transverse pinned layer." FIG. 2B depicts a portion of the synthetic spin valve having a transverse pinned layer. Referring to FIG. 2A, the conventional spin valve 30' typically includes a seed layer 31, an antiferromagnetic ("AFM") layer 32, a synthetic pinned layer 34 ("transverse synthetic pinned layer 34"), a spacer layer 36, a free layer 38, and a capping layer 40. The transverse synthetic pinned layer 34 includes magnetic layers 33 and 37 separated by a nonmagnetic layer 35. The magnetic layers 33 and 37 are separated by a distance such that the layers 33 and 37 are antiferromagnetically coupled. The seed layer is used to ensure that the material used for the AFM layer 32 has the appropriate crystal structure and is antiferromagnetic in nature. The spacer layer 36 is a non-magnetic metal, such as copper. The transverse synthetic pinned layer 34 and the free layer 38 are magnetic layers. The magnetization of the transverse synthetic pinned layer 34 is pinned in place due to an exchange coupling between the AFM layer 32 and the synthetic pinned layer 34. The magnetization of the free layer 38 is free to rotate.

Referring again to FIGS. 2A and 2B, the magnetization of the transverse synthetic pinned layer 34 is transverse, approximately ninety degrees from the longitudinal direction. Because the transverse synthetic pinned layer 34 is composed of the antiferromagnetically coupled magnetic layers 33 and 37, the magnetization of the transverse synthetic pinned layer 34 is more securely pinned in the desired direction. Therefore, the magnetic structure of the tranverse synthetic pinned layer 34 is more stable than a conventional spin valve.

Figure 3:
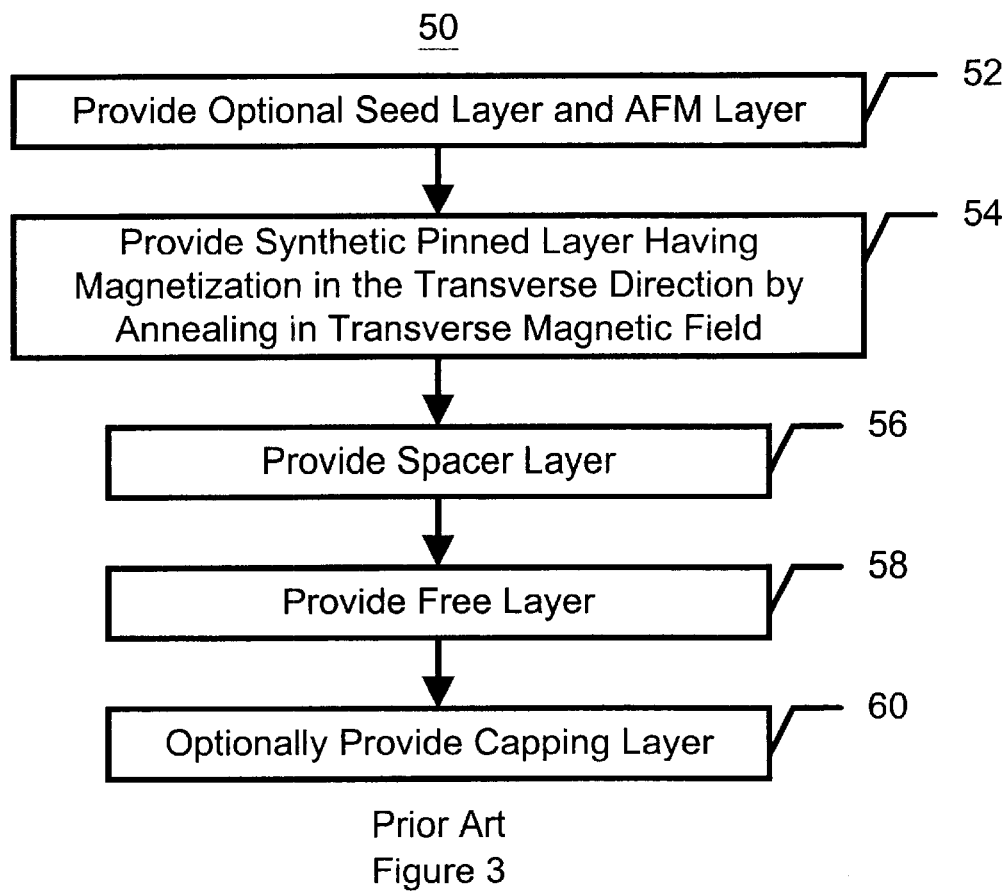
FIG. 3 is a flow chart of a conventional method for providing the synthetic spin valve having a transverse pinned layer.

FIG. 3 depicts a conventional method 50 for providing the synthetic spin valve having a transverse pinned layer 30'. The optional seed layer 31 and AFM layer 32 are provided, via step 52. The transverse synthetic pinned layer 34 having its magnetization pinned in the transverse direction is provided, via step 54. Step 54 includes depositing the transverse synthetic pinned layer 34, then annealing the transverse synthetic pinned layer 34 in a large field that is in the transverse direction. The spacer layer 36 is then typically provided, via step 56. The free layer 38 is then provided, via step 38. The capping layer 40 may then be provided, via step 60.

Although the synthetic spin valve having a transverse pinned layer shown in FIGS. 2A and 2B and made in accordance with the method shown in FIG. 3 functions, one of ordinary skill in the art will readily realize that the synthetic spin valve having a transverse pinned layer 30' has an asymmetric response. The magnetization of the free layer 38 is desired to be longitudinal, in the direction that current flows between the leads 19a and 19b of FIG. 1. Referring back to FIGS. 2A and 2B, the net magnetization of the transverse synthetic pinned layer 34 is reduced because it includes antiferromagnetically coupled layers 33 and 37. Because of the reduced magnetic moment of the transverse synthetic pinned layer 34, the magnetization of the free layer 38 is tilted from longitudinal when no external magnetic field is applied. This tilt is depicted in FIG. 2B. Referring back to FIGS. 2A and 2B, if the transverse synthetic pinned layer 34 did not have a reduced magnetization, the interlayer coupling between the transverse synthetic pinned layer 34 and the free layer 38, the demagnetization field of the transverse synthetic pinned layer 34, and the magnetic field due to the bias current driven through the synthetic spin valve 30' having a transverse pinned layer 34 would ensure that the magnetization of the free layer was biased in the longitudinal direction. However, because the transverse synthetic pinned layer 34 has a reduced magnetization, these magnetic fields do not longitudinally bias the magnetization of the free layer 38.

Because the magnetization of the free layer 34 is tilted from the longitudinal direction, an external magnetic field in one direction will cause a greater rotation in the magnetization from the longitudinal direction than an external magnetic field in the opposite direction. The difference in directions of magnetization between the transverse synthetic pinned layer 34 and the free layer 38 determines the MR and, therefore, the response of the synthetic spin valve 30' having a transverse pinned layer 34 to an external field. Thus, the response of the synthetic spin valve 30' having a transverse pinned layer 34 to a magnetic recording media will be asymmetric. Asymmetries in the response of the synthetic spin valve 30' having a transverse pinned layer 34 are undesirable. When the asymmetry is large enough, the synthetic spin valve 30' having a transverse pinned layer 34 is unusable.

The present invention provides a method and system for providing a spin valve for use in a magnetoresistive head. The method and system comprise providing a synthetic pinned layer, a nonmagnetic spacer layer, and a free layer. The free layer has a first magnetization canted from a first direction by a first angle. The nonmagnetic spacer layer is disposed between the free layer and the synthetic pinned layer. The synthetic pinned layer has a second magnetization in a second direction. The second direction is canted from a third direction that is transverse to the first direction by a second angle. The second magnetization is substantially orthogonal to the first magnetization.

The present invention will be described in terms of a particular embodiment of a spin valve that includes particular materials. The present invention will also be described in the context of a particular method for providing the spin valve. However, one of ordinary skill in the art will readily recognize that this method and system will operate effectively for other materials and other methods for providing the spin valve.

Figure 4A:
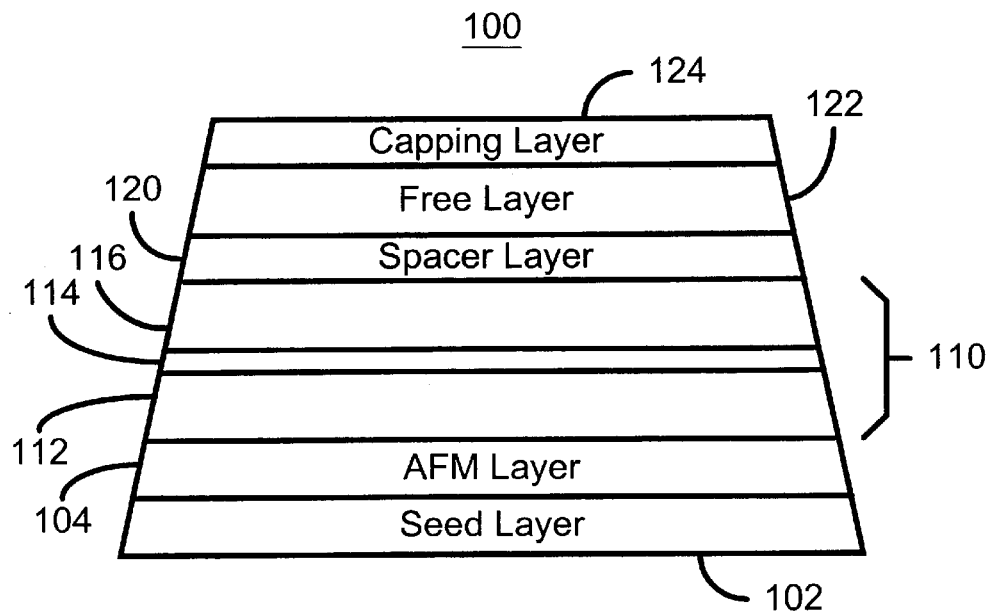
FIG. 4A is a diagram of a MR head including a spin valve having a canted synthetic pinned layer in accordance with the present invention.
Figure 4B:
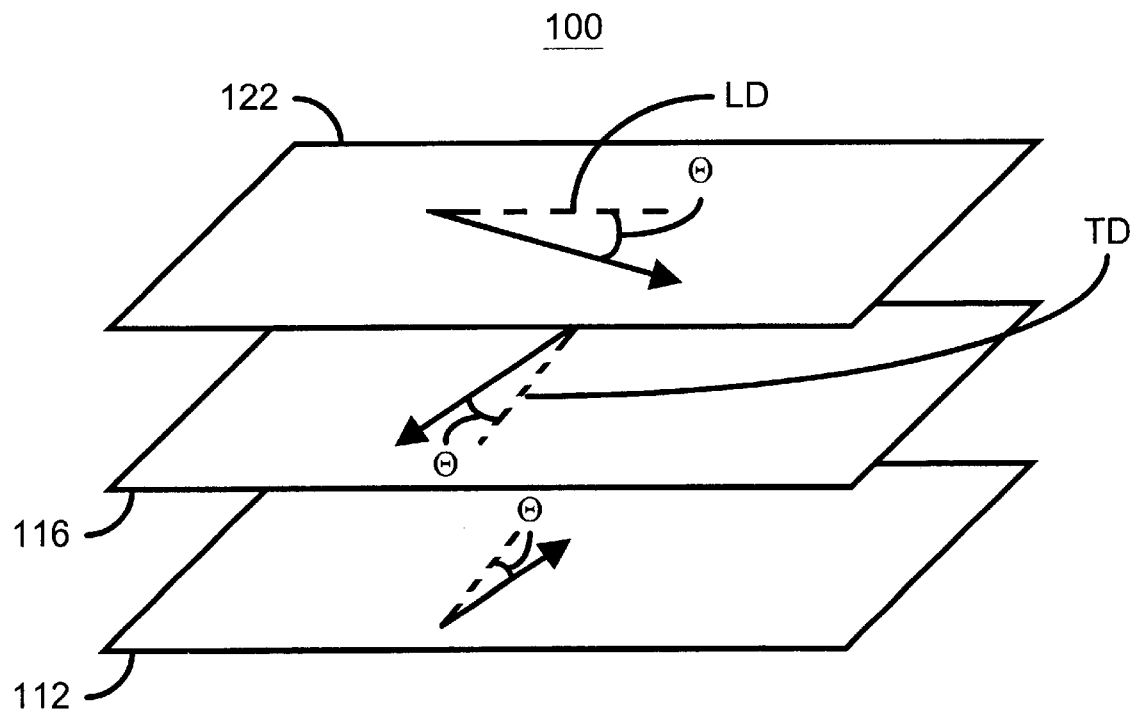
FIG. 4B is another view of the synthetic spin valve having a pinned layer in accordance with the present invention.

To more particularly illustrate the method and system in accordance with the present invention, refer now to FIG. 4A, depicting one embodiment of a spin valve 100 in accordance with the present invention. The spin valve 100 could be used as the MR sensor 30 in the MR head 10 depicted in FIG. 1. FIG. 4B depicts a portion of the spin valve 100 in accordance with the present invention. Referring to FIG. 4A, the spin valve 100 includes an optional seed layer 102, an AFM layer 104, a synthetic pinned layerl 10 in accordance with the present invention, a nonmagnetic spacer layer 120, a free layer 122, and an optional capping layer 124. The synthetic pinned layer 110 includes magnetic layers 112 and 116 separated by a nonmagnetic layer 114, such as Ru. The magnetic layers 112 and 116, which preferably include CoFe, are separated by a distance such that the magnetic layers 112 and 116 are antiferromagnetically coupled. The spacer layer 120 is a nonmagnetic metal, such as copper. The synthetic pinned layer 110 and the free layer 122 are magnetic layers. In one embodiment, the free layer is a layer of NiFe. In another embodiment, the free layer 122 could be a multilayer, such as a multilayer including layers of CoFe and NiFe. The magnetization of the synthetic pinned layer 110 is pinned in place due to an exchange coupling between the AFM layer 104 and the synthetic pinned layer 110. The AFM layer could include IrMn, PtMn, or PtPdMn. Although magnetically biased, as discussed below, the magnetization of the free layer 122 is free to rotate in response to an external field, for example from a recording media.

Referring to FIGS. 4A and 4B, the magnetization of the free layer 122 is biased generally in a longitudinal direction LD. The magnetization of the free layer 122 is, however, canted from being exactly in the longitudinal direction LD. In this respect, the spin valve 100 is similar to the spin valve 30' having the transverse pinned layer. However, the magnetization of the synthetic pinned layer 110 is also canted from a transverse direction TD. In one embodiment, the magnetization of the synthetic pinned layer 110 is canted by at least approximately plus or minus, ten degrees from the transverse direction. Thus, the angle, $\Theta$, is at least ten degrees in the direction shown, or in the opposite direction from the transverse direction. In a preferred embodiment, the synthetic pinned layer 110 is canted by approximately plus or minus thirty degrees from the transverse direction. However, nothing prevents the synthetic pinned layer 110 from being canted at another angle from the transverse direction. Also in a preferred embodiment, the magnetization of the synthetic pinned layer 110 is canted from the transverse direction by approximately the same angle that the magnetization of the free layer 122 is canted from the longitudinal direction.

Because the magnetization of the pinned layer 110 is canted at an angle from the transverse direction, the magnetization of the free layer 122 is substantially orthogonal to the magnetization of the pinned layer 110 when no external field is applied. Thus, the demagnetization field of the synthetic pinned layer 110, the interlayer coupling between the synthetic pinned layer 110 and the free layer 122, and the bias current driving the spin valve 100 during use combine to bias the magnetization of the free layer 122 substantially perpendicular to the magnetization of the pinned layer 110.

Because the free layer 122 is substantially perpendicular to the magnetization of the pinned layer 110 in the absence of an external field, the asymmetry in the response of the free layer 122 is reduced. The response of the spin valve 100 depends upon the angle between the magnetization of the free layer 122 and the pinned layer 110. The magnetizations of the free layer 122 and the pinned layer 110 in the absence of an external field are orthogonal. As a result, the magnitude of the, angle between the magnetization of the free layer 122 and the pinned layer 100 is approximately the same for external fields of the same magnitude but opposite directions. In other words, the relative angle between the magnetization of the free layer 122 and the magnetization of the pinned layer 110 is the same for media fields in both directions. The response of the spin valve 100 has, therefore, approximately the same magnitude for media fields in opposite directions. Consequently, the MR of the spin valve 100 is substantially symmetric, which is desirable.

Figure 5A:
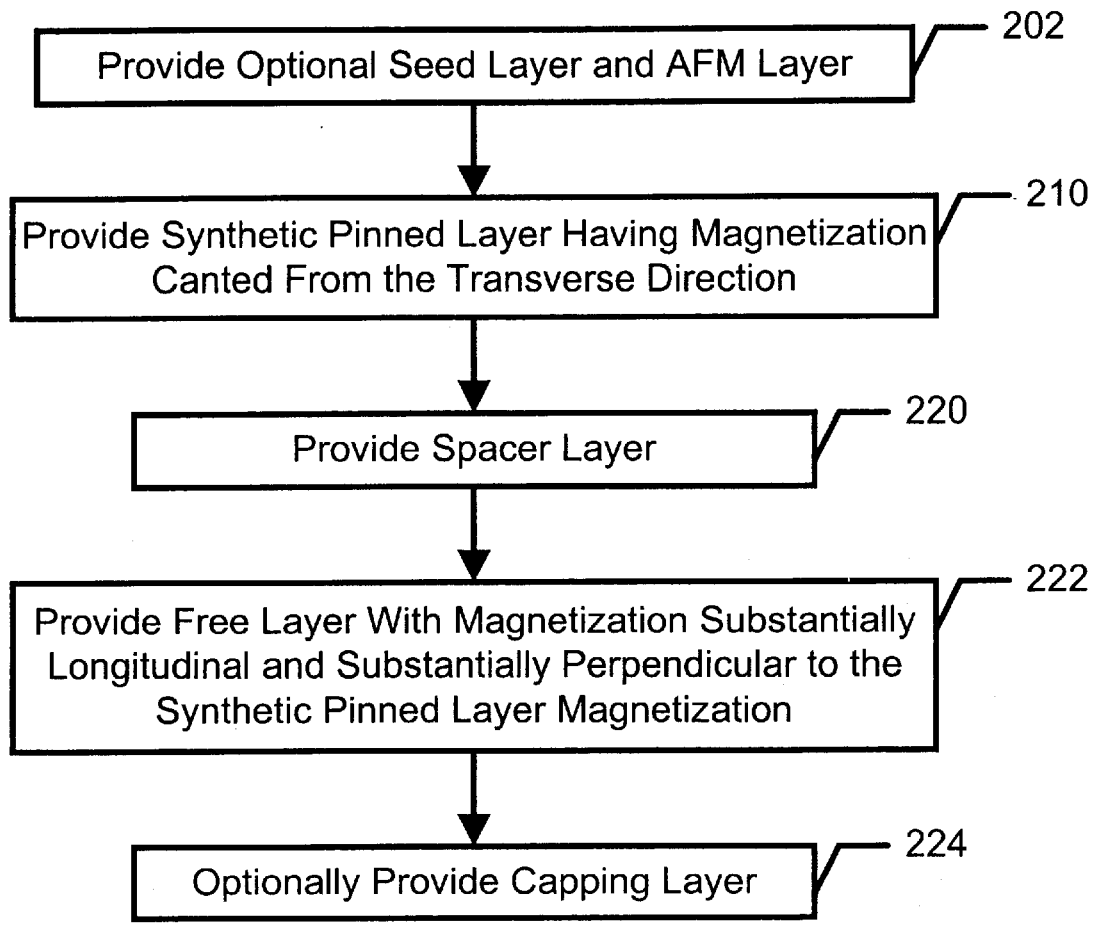
FIG. 5A is a flow chart depicting one embodiment of a method for providing a synthetic spin valve having a synthetic pinned layer.

FIG. 5A depicts on embodiment of a method 200 in accordance with the present invention for providing the spin valve 100. The optional seed layer 102 and AFM layer 104 are provided, via 202. The synthetic pinned layer 110 having its magnetization pinned in a direction that is canted from the transverse direction is then provided, via step 210. The spacer layer 120 is provided, via step 220. The free layer 122 is provided, via step 222. The magnetization of the free layer 122 is substantially in the longitudinal direction. The optional capping layer 124 may then be provided, via step 224.

Figure 5B:
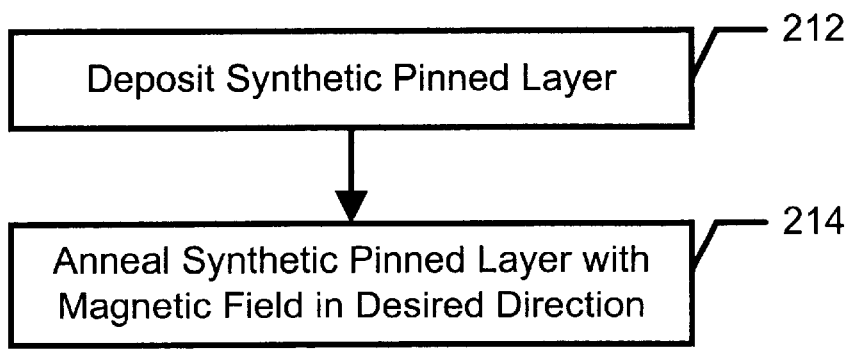
FIG. 5B is a flow chart depicting a preferred embodiment of a method for providing the synthetic pinned layer having a canted magnetization.

FIG. 5B depicts a preferred embodiment of the step 210, providing the synthetic pinned layer 110 having its magnetization pinned in a direction that is canted from the transverse direction. The synthetic pinned layer 110 is deposited, via step 212. Preferably, step 212 includes depositing the first magnetic layer 112, depositing the nonmagnetic layer 114, then depositing the second magnetic layer 116. The synthetic pinned layer 110 is then annealed in a magnetic field in a direction canted from the transverse direction, via step 214. In a preferred embodiment, this will result in the magnetization of the synthetic pinned layer 110 being in substantially the same direction as the magnetic field used in annealing. Thus, a sufficiently large field is desired to be used in step 214. In one embodiment, the magnetic field is at least 10,000 Oe. In one embodiment, the desired direction is achieved by rotating the substrates on which the spin valves 100 are formed in a magnetic field that is otherwise set to be in a transverse direction. In another embodiment, the direction of the magnetic field may be rotated. However, in either case, the desired direction of the magnetization of the pinned layer, canted from the transverse direction by approximately ten degrees or more, can easily be achieved.

Note, however, that nothing prevents the use of another method for obtaining the desired direction for the magnetization of the pinned layer 110. For example, the desired direction could be obtained by annealing the synthetic pinned layer 110 in a lower magnetic field that is in the transverse direction. For example, a field of six thousand Oe rather than ten thousand Oe may be used. If the magnetic field is sufficiently low, the magnetization of the synthetic pinned layer 110 will only be partially aligned by the annealing step. Thus, the tb magnetization of the synthetic pinned layer 100 may be canted from the transverse direction by ten degrees or more. However, this method is significantly more difficult to control than the method 210 depicted in FIG. 5B.

Figure 6:
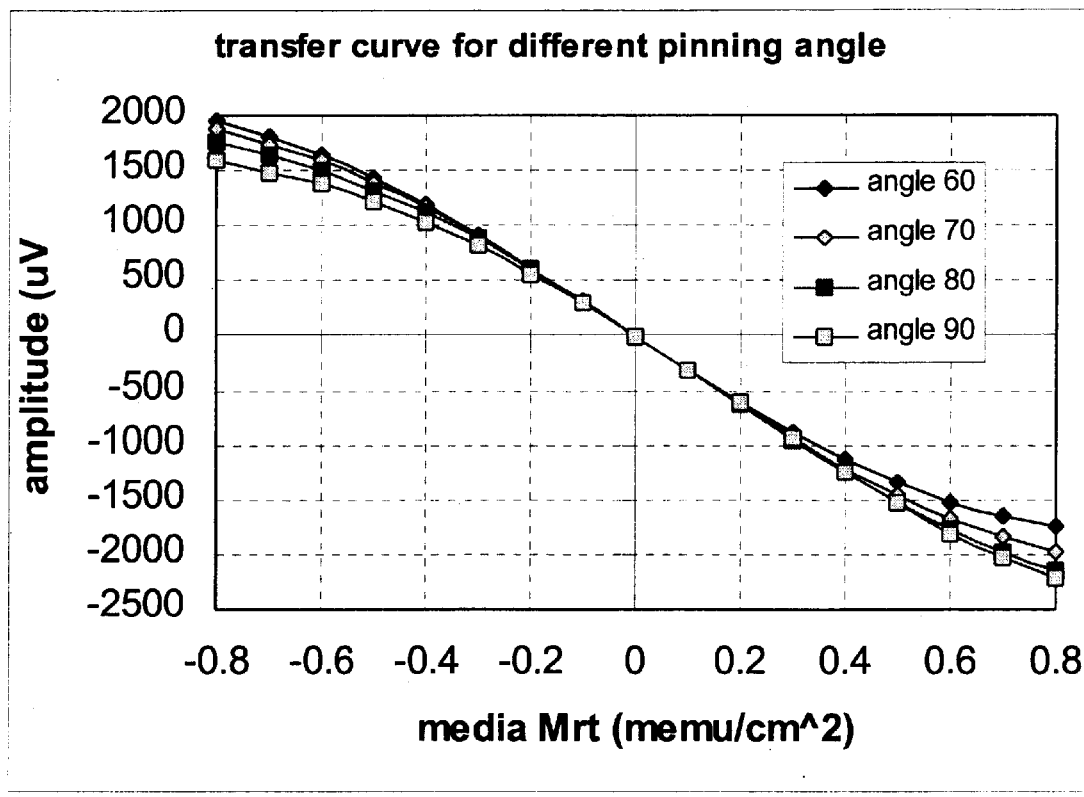
FIG. 6 is a graph depicting the modeled transfer curves for various pinning angles.

FIGS. 6–9 depict the differences between embodiments of the spin valve 100 and the synthetic spin valve having a transverse pinned layer 30'. FIG. 6 depicts the modeled track average amplitude ("TAA") versus media Mrt for the canted synthetic pinned layer 110 or the transverse synthetic pinned layer 34. The TAA is the peak to peak amplitude of the signal for a particular spin valve. The Mrt for a media is the remanence magnetization multiplied by the thickness. The curves in FIG. 6 are for spin valves having angles of sixty, seventy, eighty, and ninety degrees between the free layer and the synthetic pinned layer. Thus, the spin valves having angles of sixty, seventy, or eighty degrees are embodiments of the spin valve 100 in accordance with the present invention. The spin valve having an angle of ninety degrees corresponds to the synthetic spin valve 30' having a transverse pinned layer 34. As can be seen in FIG. 6, the curves for spin valves 100 having angles of sixty, seventy, or eighty degrees are more symmetric.

Figure 7:
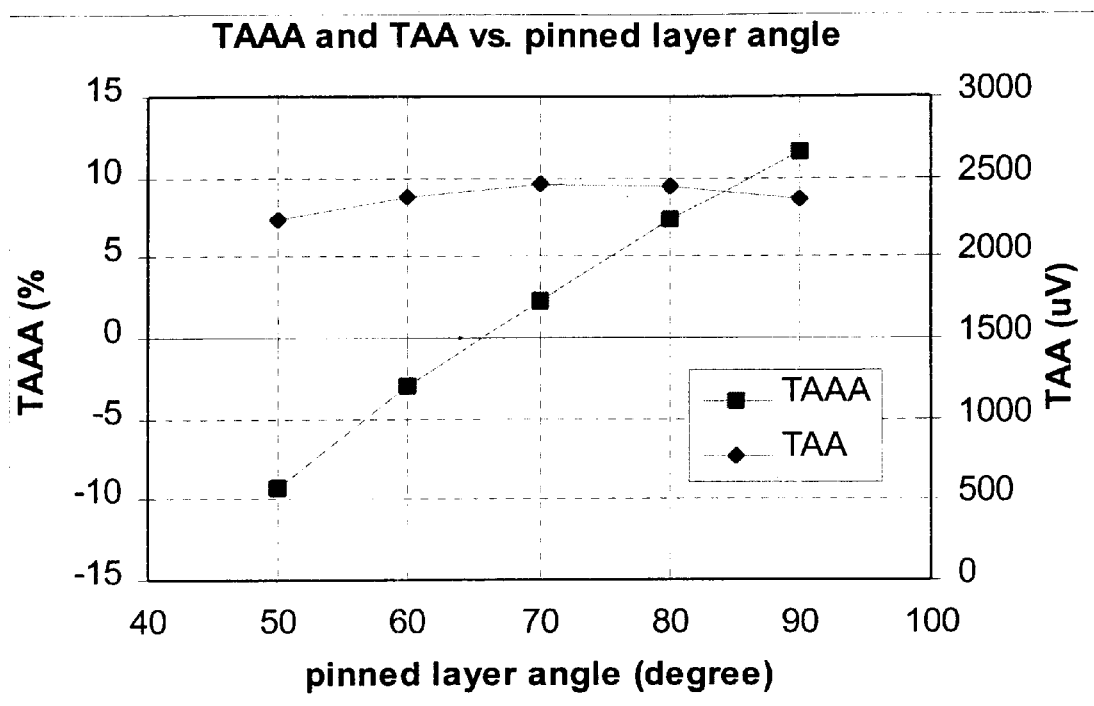
FIG. 7 is a graph depicting the track average amplitude and track average amplitude asymmetry versus pinning angle.

FIG. 7 depicts the modeled TAA and track average amplitude asymmetry ("TAAA") versus angle between the net magnetization of the synthetic pinned layer 110 or 34 and the longitudinal direction LD, shown in FIG. 4B. The TAAA is defined as (maximum signal−minimum signal)/(maximum signal+minimum signal). An angle of ninety degrees corresponds to the synthetic spin valve 30' having a transverse pinned layer 34, while an angle other than ninety degrees corresponds to an embodiment of the spin valve 100. As can be seen in FIG. 7, the TAAA is reduced for embodiments of the spin valve 100. In addition, the TAA is higher for embodiments of the spin valve 100 having angles of sixty, seventy, or eighty degrees. Thus, not only is asymmetry improved, but the amplitude is also improved. Note that if free layer of the spin valve in accordance with the present invention is initialized in the opposite direction, the TAAA will be different. However, the principle of operation remains unchanged.

Figure 8A:
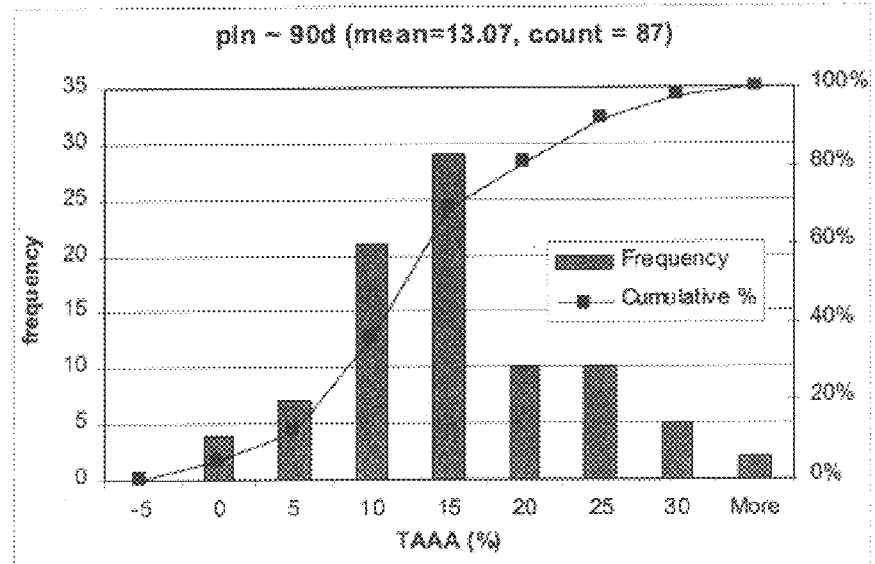
FIG. 8A is a histogram depicting the asymmetry for a synthetic spin valve having a transverse pinned layer.
Figure 8B:
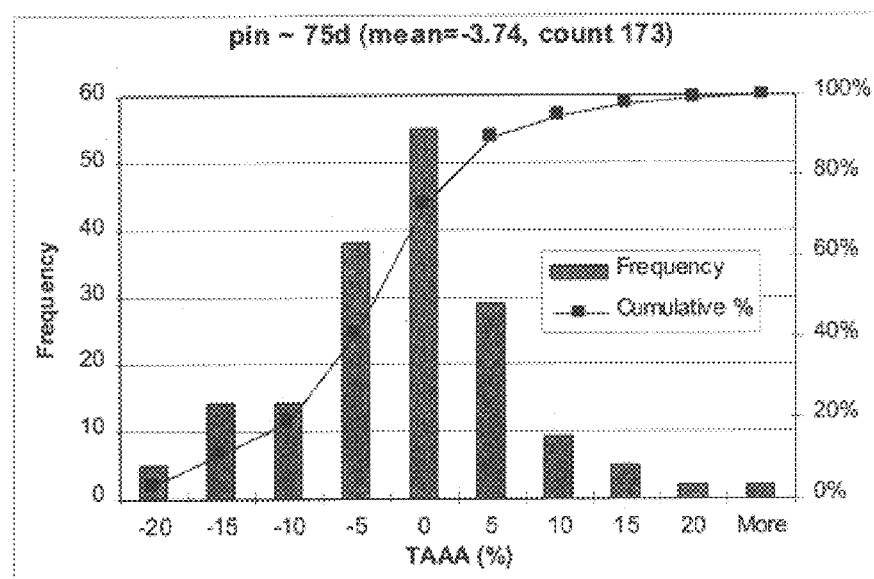
FIG. 8B is a histogram depicting the asymmetry for a spin valve using a synthetic pinned layer in accordance with the present invention.

FIGS. 8A and 8B depicted histograms of the TAAA in percentage versus the frequency of occurrence for the conventional spin valve 30' and the spin valve 100, respectively. As can be seen in FIGS. 8A and 8B, there is a much higher number of spin valves 100 having close to zero TAAA than for the synthetic spin valve 30' having a transverse pinned layer 34. Furthermore, if it is assumed that plus or minus fifteen percent TAAA is unacceptable for use, as is typically the case, a significantly higher number of conventional spin valve 30' will be discarded as unusable. Thus, the spin valves 30' also have a higher yield.

Furthermore, the method 200 results in the improved spin valves 100 and yield without significantly complicating processing of the spin valve 100. The reduced asymmetry (TAAA), improved amplitude in some cases (TAA) and improved yield can be achieved simply by rotating the direction of the applied field during annealing, as discussed with respect to FIG. 5B. This procedure is relatively simple and does not significantly complicate the process for fabricating a spin valve, yet results in significant improvement in performance. Consequently, the benefits of the spin valve 100 may be relatively easily achieved.

A method and system has been disclosed for providing a spin valve having a synthetic pinned layer that also has reduced asymmetry. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A spin valve for use in a magnetoresistive head comprising:
   a free layer having a first magnetization that is canted from a first direction by a first angle;
   a synthetic pinned layer having a second magnetization in a second direction, the second direction being canted by a second angle from a third direction that is transverse to the first direction, the second magnetization being substantially orthogonal to the first magnetization; and
   a nonmagnetic spacer layer disposed between the free layer and the synthetic pinned layer;
   wherein the first direction is a longitudinal direction.

2. The spin valve of claim 1 wherein the second angle is greater than or equal to approximately ten degrees.

3. The spin valve of claim 2 wherein the second angle is at least twenty degrees.

4. The spin valve of claim 2 wherein the second angle is approximately thirty degrees.

5. The spin valve of claim 2 wherein the second angle is between ten and thirty degrees.

6. The spin valve of claim 1 further comprising:
   an antiferromagnetic layer adjacent to the synthetic pinned layer, the antiferromagnetic layer for pinning the second magnetization of the synthetic pinned layer in the second direction.

7. The spin valve of claim 6 wherein the antiferromagnetic layer further includes a layer of IrMn.

8. The spin valve of claim 6 wherein the antiferromagnetic layer further includes a layer of PtMn.

9. The spin valve of claim 6 wherein the antiferromagnetic layer further includes a layer of PtPdMn.

10. The spin valve of claim 1 wherein the second angle and the first angle are substantially the same.

11. A method for providing a spin valve for use in a magnetoresistive head comprising the steps of:

(a) providing a free layer having a first magnetization canted from a first direction by a first angle;

(b) providing a synthetic pinned layer having a second magnetization in a second direction, the second direction being canted from a third direction that is transverse to the first direction by a second angle, the second magnetization being substantially orthogonal to the first magnetization; and (c) providing a nonmagnetic spacer layer disposed between the free layer and the synthetic pinned layer; wherein the first direction is a longitudinal direction.

12. The method of claim 11 wherein the second angle is greater than or equal to approximately ten degrees.

13. The method of claim 11 wherein the second angle is at least twenty degrees.

14. The method of claim 11 wherein the second angle is approximately thirty degrees.

15. The method of claim 11 wherein the second angle is between ten and thirty degrees.

16. The method of claim 11 wherein the step of providing the synthetic pinned layer (b) further includes the steps of:

(b1) depositing the synthetic pinned layer; and (b2) annealing the synthetic pinned layer in a magnetic field having a fourth direction that is substantially the same as the second direction.

17. The method of claim 11 further comprising the step of:

(c) providing an antiferromagnetic layer adjacent to the synthetic pinned layer, the antiferromagnetic layer for pinning the second magnetization of the synthetic pinned layer in the second direction.

18. The method of claim 17 wherein the antiferromagnetic layer further includes a layer of IrMn.

19. The method of claim 17 wherein the antiferromagnetic layer further includes a layer of PtMn.

20. The method of claim 17 wherein the antiferromagnetic layer further includes a layer of PtPdMn.

21. The method of claim 10 wherein the second angle and the first angle are substantially the same.

22. The spin valve of claim 1 wherein the second angle is less than or equal to approximately thirty degrees.

23. The spin valve of claim 1 wherein the first direction is a longitudinal direction.

24. The method of claim 11 wherein the second angle is less than or equal to approximately thirty degrees.

25. The spin valve of claim 1 wherein the first direction is a longitudinal direction.

* * * * *